United States Patent [19]

Konishi

[11] Patent Number: 5,570,157
[45] Date of Patent: Oct. 29, 1996

[54] VISUAL AXIS DETECTION APPARATUS

[75] Inventor: Kazuki Konishi, Tokyo, Japan

[73] Assignee: Canon Kabushiki Kaisha, Tokyo, Japan

[21] Appl. No.: 249,683

[22] Filed: May 26, 1994

Related U.S. Application Data

[63] Continuation of Ser. No. 142,060, Oct. 28, 1993, abandoned.

[30] Foreign Application Priority Data

Oct. 30, 1992 [JP] Japan .................. 4-314408
Oct. 30, 1992 [JP] Japan .................. 4-314409

[51] Int. Cl.⁶ .................................. G03B 13/02
[52] U.S. Cl. .................................. 396/232; 396/383
[58] Field of Search ................... 354/410, 62, 219; 351/210, 211; 348/78

[56] References Cited

U.S. PATENT DOCUMENTS

| | | |
|---|---|---|
| 3,712,716 | 1/1973 | Cornsweet et al. ........... 351/211 X |
| 3,724,932 | 4/1973 | Cornsweet et al. ........... 351/211 X |
| 4,973,149 | 11/1990 | Hutchinson ................... 351/210 |
| 5,182,443 | 1/1993 | Suda et al. ................... 354/219 X |
| 5,280,312 | 1/1994 | Yamada et al. ................ 351/211 |
| 5,402,199 | 3/1995 | Akashi ........................ 354/410 |

FOREIGN PATENT DOCUMENTS 61-172552  8/1986  Japan .

*Primary Examiner*—W. B. Perkey
*Attorney, Agent, or Firm*—Fitzpatrick, Cella, Harper & Scinto

[57] ABSTRACT

The invention relates to an apparatus with an illumination device for illuminating an eyeball; a light-receiving device having a plurality of photoelectric changing elements for changing reflected light from the eyeball; a storage device for storing a plurality of Purkinje image candidates among the signals obtained by receiving light with said light-receiving device; a selection device for selecting suitable Purkinje image candidates as the Purkinje image from the plurality of Purkinje image candidates; and a detection device for detecting the state of the visual axis on the basis of the Purkinje image selected by the selection device.

15 Claims, 16 Drawing Sheets

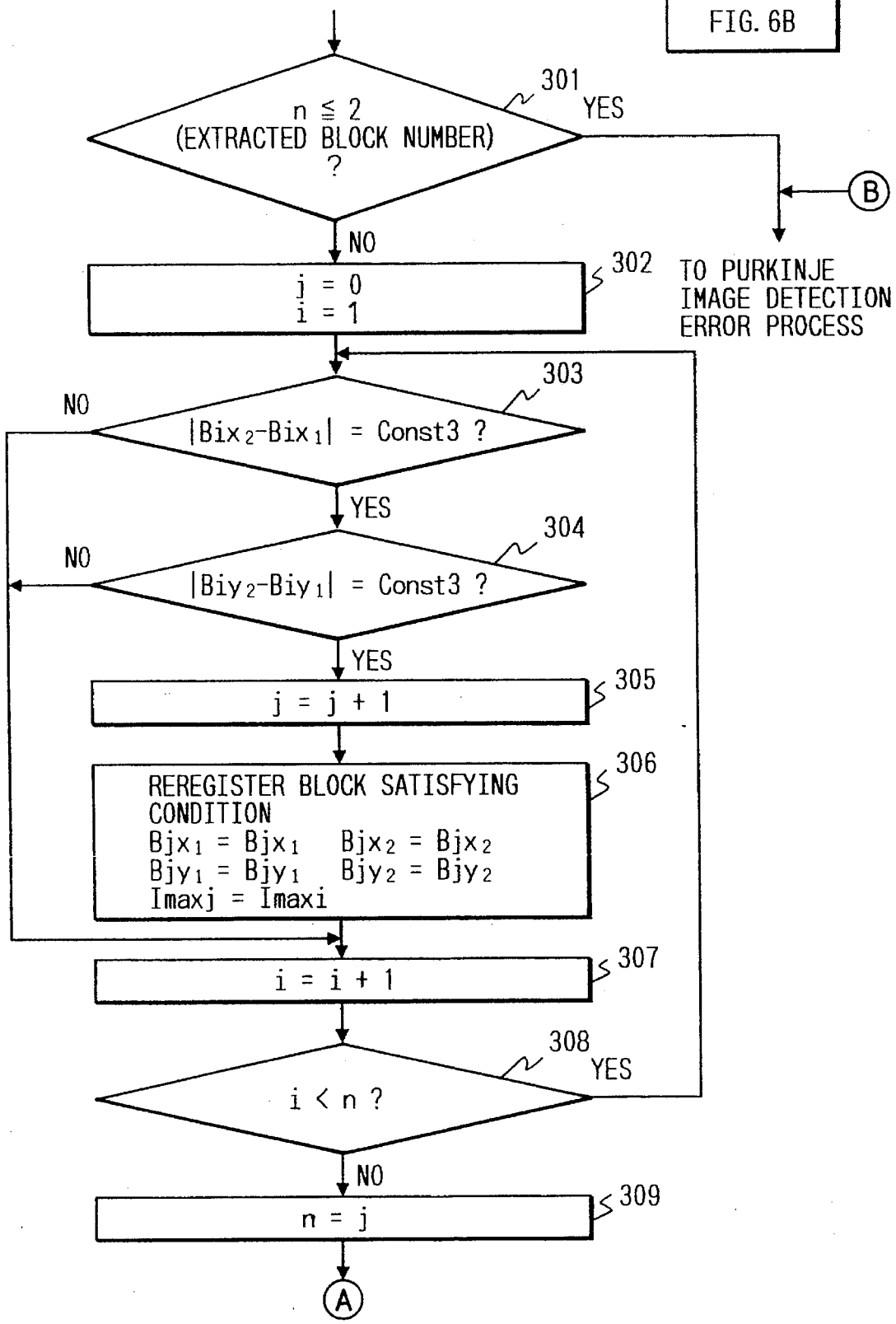

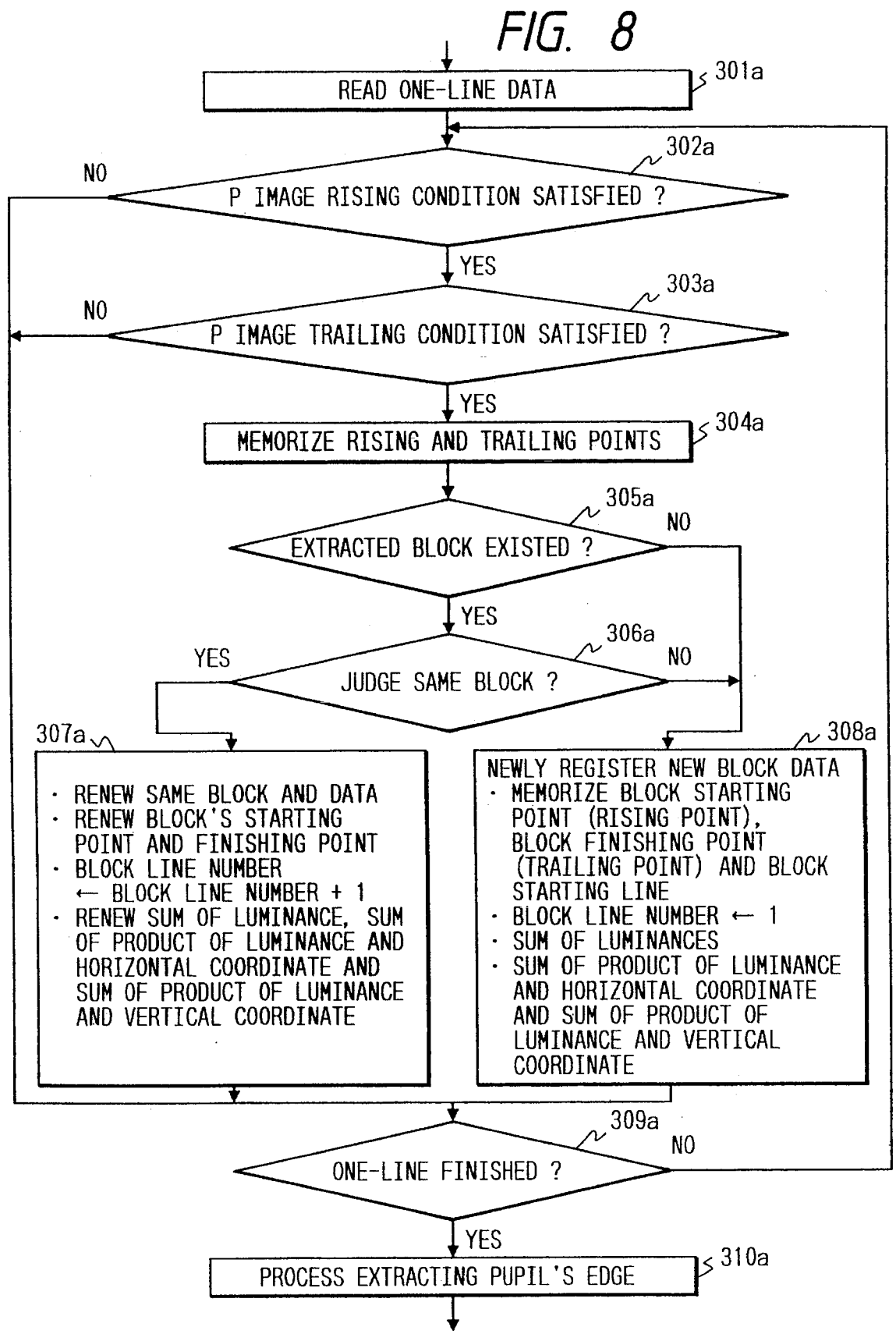

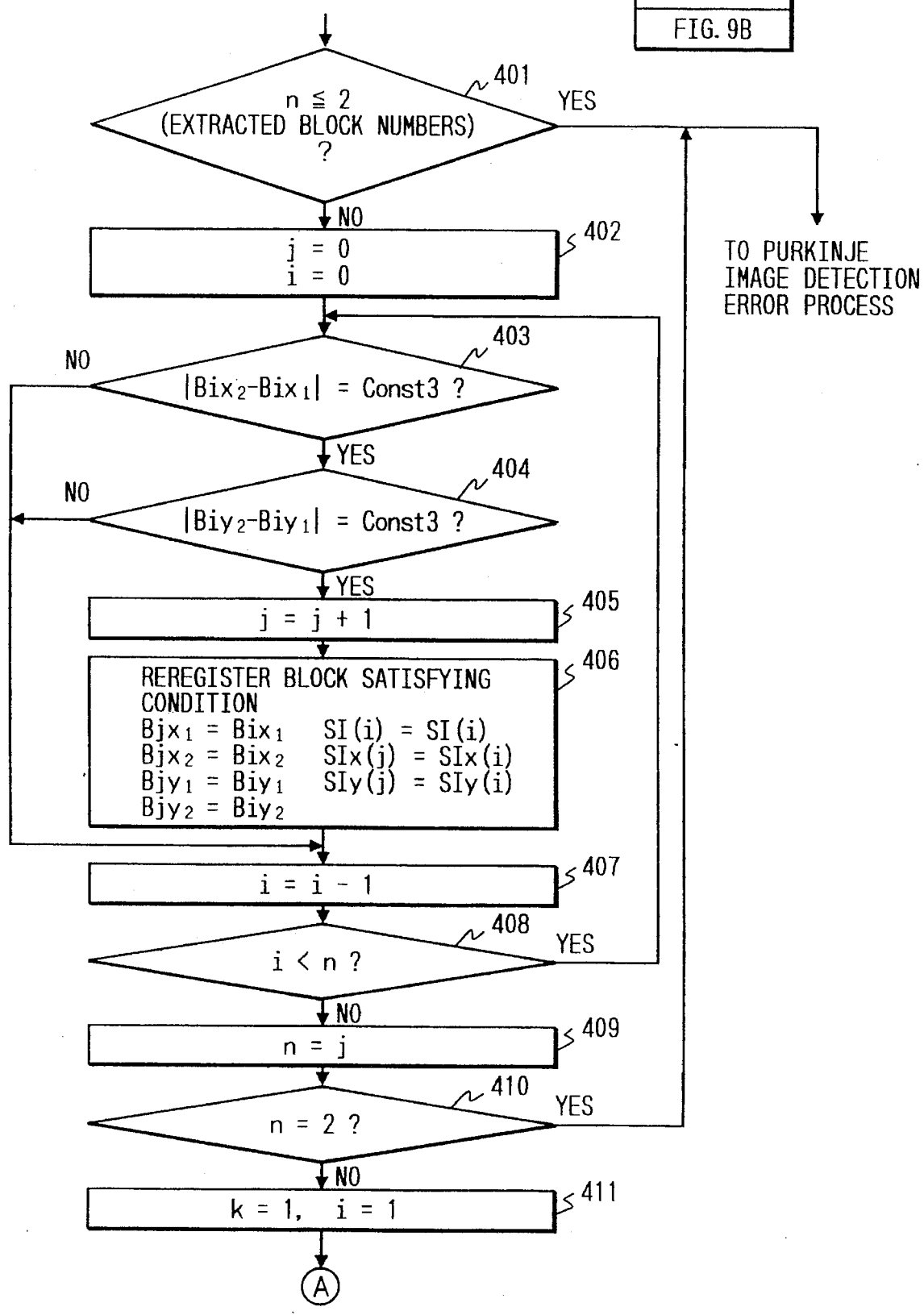

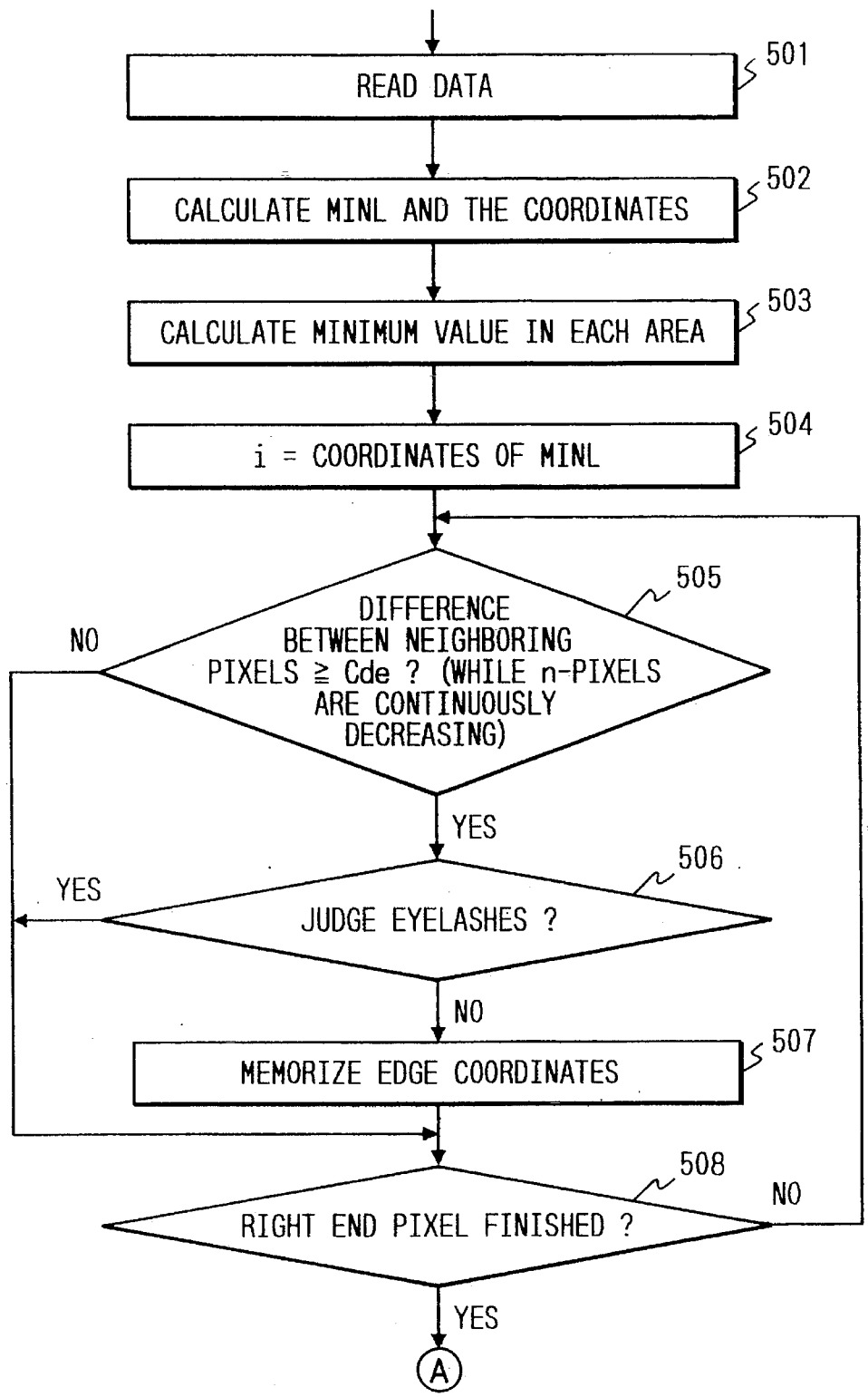

5,570,157

VISUAL AXIS DETECTION APPARATUS

This application is a continuation of prior application Ser. No. 08/142,060 filed on Oct. 28, 1993, now abandoned.

BACKGROUND OF THE INVENTION

1. Field of the Invention

The present invention relates to improvement of a visual axis detection apparatus used in a camera using a film, a video camera, and so on.

2. Related Background Art

A conventional method of calculating a position of a Purkinje image (a corneal reflection image) is disclosed, for example, in Japanese Patent Application Laid-Open No. 61-172552 or the like. FIG. 13 shows this conventional embodiment disclosed in Japanese Patent Application Laid-Open No. 61-172552.

If a light emitting element (not shown) is lighted with alternating current by a driver circuit, a four-divisional element or a semiconductor position detector (PSD) 31, and a circuit 40 measure the position of an image of the Purkinje effect, which is digitized by an A/D converter (not shown) to be input into a control circuit.

In the above-mentioned conventional apparatus, however, the following problem arises.

That is, in the conventional apparatus, the center of gravity of the Purkinje image is obtained by calculating the center of gravity of the light image formed on the two-dimensional semiconductor element (two-dimensional PSD) by means of the digital circuit. Accordingly, if a signal similar to the Purkinje image such as tears of an observer, a ghost image or the like of the spectacles worn by the observer, or the like exists, or if an extremely high luminous light image is formed by light coming from outside or the like, bad effects thereof make it difficult to precisely obtain the position of the Purkinje image.

SUMMARY OF THE INVENTION

The object of the present invention is to provide a visual axis detection apparatus which can avoid influence of the extremely luminous light images caused by, for example, the light coming from outside or the like and precisely extract the Purkinje image.

In preferable embodiments according to the present invention, a Purkinje image extraction means contains a Purkinje image candidate storage means for detecting light images having luminance greater than a predetermined value in the signals from a light receiving means and storing said plurality of light images as Purkinje image candidates, among which a proper image for the Purkinje image is selected.

Also, the present invention detects the slopes of rising and trailing of the level signals of the Purkinje image candidates.

Further, the present invention is provided with a Purkinje image selection means for judging the positional relation between the Purkinje image candidates stored by the Purkinje image candidate storage means and a pupil and selecting the Purkinje image on the basis of the result of said judgement, wherein the Purkinje image candidate nearest to the pupil (the center of the pupil) is selected as the Purkinje image.

BRIEF DESCRIPTION OF THE DRAWINGS

FIG. 8 is a flowchart for detecting the Purkinje image in the camera provided with the second embodiment of the apparatus according to the present invention.

DETAILED DESCRIPTION OF THE PREFERRED EMBODIMENTS

Figure 1:
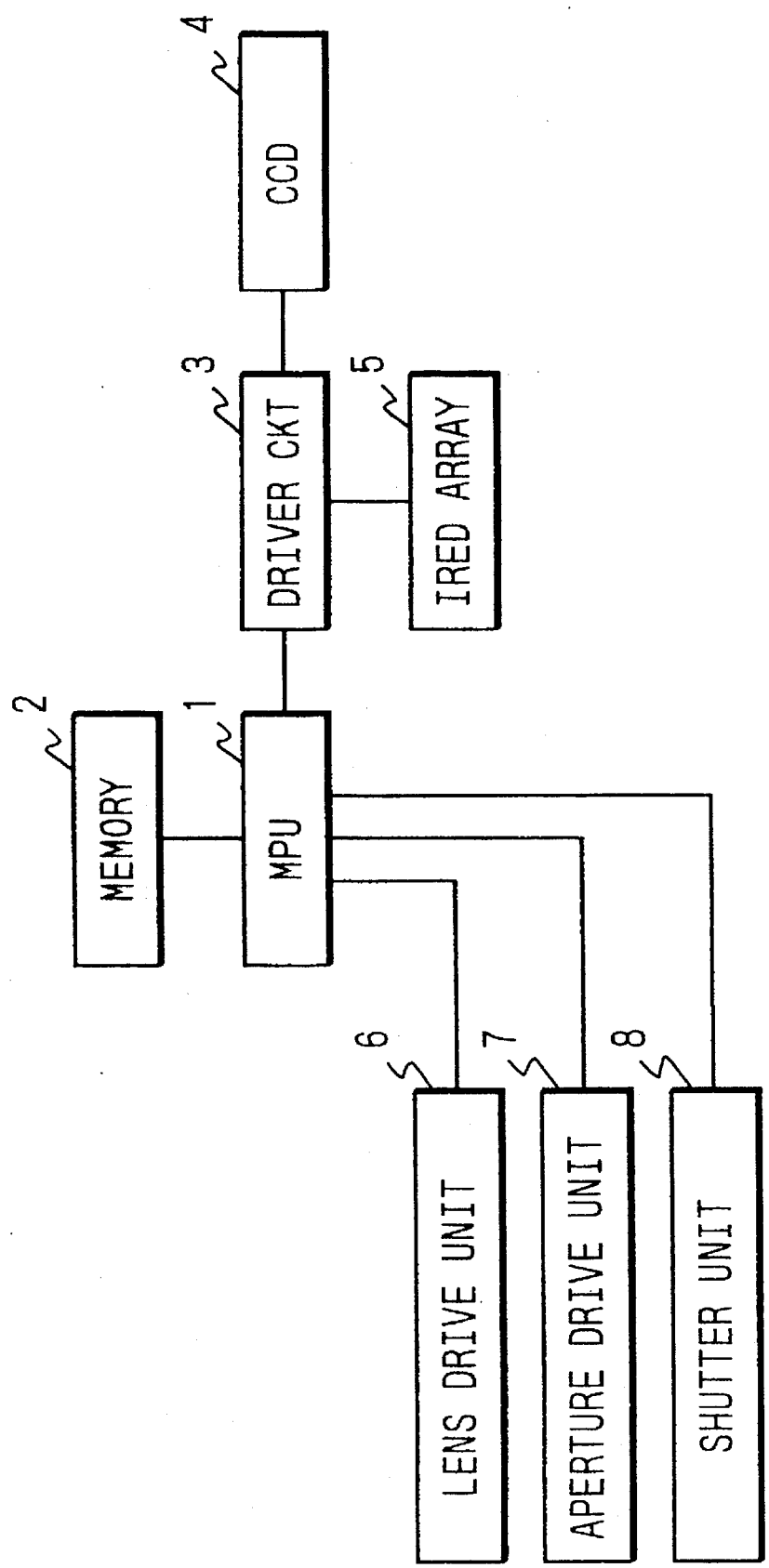
FIG. 1 is a block diagram schematically showing the constitution of a camera provided with the first embodiment of the visual axis detection apparatus according to the present invention.

The present invention will be described below in detail with reference to the embodiment shown in the drawings.

FIG. 1 is a block diagram schematically showing the constitution of a camera provided with the first embodiment of the visual axis detection apparatus according to the present invention.

In FIG. 1, reference numeral 1 denotes: an MPU (microprocessing unit ), 2: a memory, 3: a driver circuit for driving a CCD and IREDs (infrared light emitting diodes), which are described later, 4: an area sensor, for example, a CCD, consisting of pixels arranged two-dimensionally, 5: an IRED array consisting of a plurality of IREDs for projecting infrared rays, to which the eyeball of the observer are insensible, to said eyeball, wherein the IREDs are arranged so as to respectively constitute as one pair in the horizontal and vertical directions at a predetermined interval. Reference numeral 6 denotes: a lens drive unit for AF (auto-focusing operation), 7: an aperture drive unit, and 8: a shutter drive unit.

Figure 2:
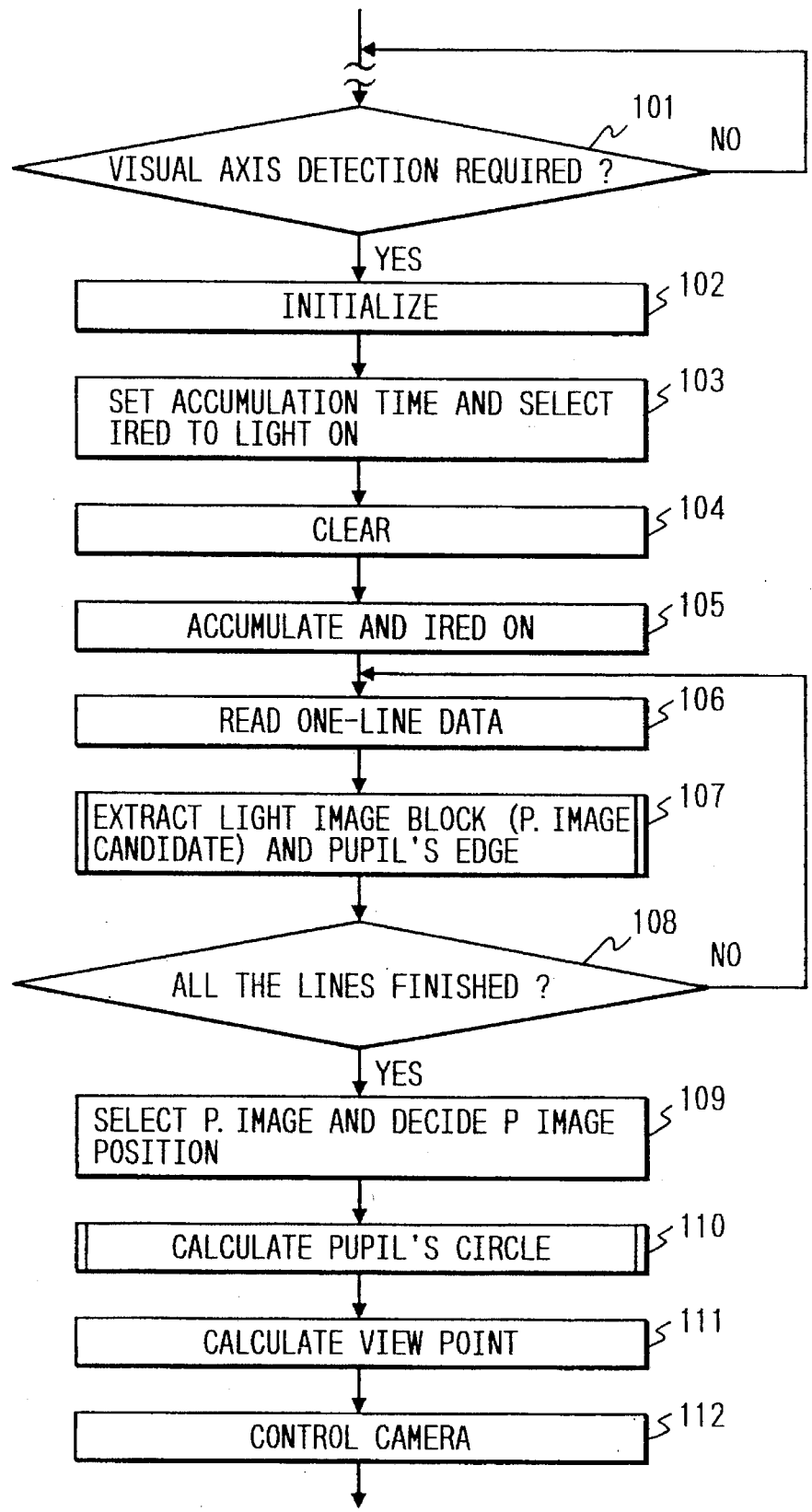
FIG. 2 is a flowchart showing the main operation of the camera shown in FIG. 1.

FIG. 2 is a flowchart for the main operation of the camera provided with the visual axis detection apparatus having the above-mentioned constitution.

When, for example, a switch SW1 is turned on with the first stroke operation of a release button (not shown) of the camera, detection of the visual axis is required. Then, the MPU1 starts the routine of visual axis detection at step 102.

In step 102, variables to be used for calculation are initialized. Next in step 103, accumulation time is set (step 103), which is performed in consideration of presence/ absence of glasses, intensity of light coming from outside, and so on. At the same time a pair of IREDs to be lighted on is also selected from the IRED array 5. Then, the operation proceeds to step 104, where accumulation control operation starts.

First, in step 104, the driver circuit 3 is directed to clear electric charge from photoelectric transfer elements of the CCD 4 in order to remove electric charge remaining in a memory zone of the CCD 4, an electric charge transfer line, and so on. Then, in step 105, an IRED selection signal is sent to the driver circuit 3 to turn on the pair of IREDs selected in the above-mentioned step 103. At the same time an accumulation signal is changed to a high level to start accumulation performed by the CCD 4, and after the accumulation time determined as described above elapses the accumulation signal is changed to a low level to finish the accumulation. During the accumulation, the selected pair of IREDs is turned on.

Subsequently, the MPU 1 advances operation to step 106, where extraction process of light images (Purkinje image candidates) and pupil's edge candidates is started.

First, in step 106, image signals of one line of the CCD 4 are read in sequence via driver circuit 3 and subjected to A/D conversion. And the values and the coordinates thereof are stored in the memory 2. Next, in step 107, the light image blocks (Purkinje image candidates) and the pupil's edge candidates are extracted according to the resultant data. Image signals for numbers of lines of the CCD 4 are processed as described above.

Figure 3:
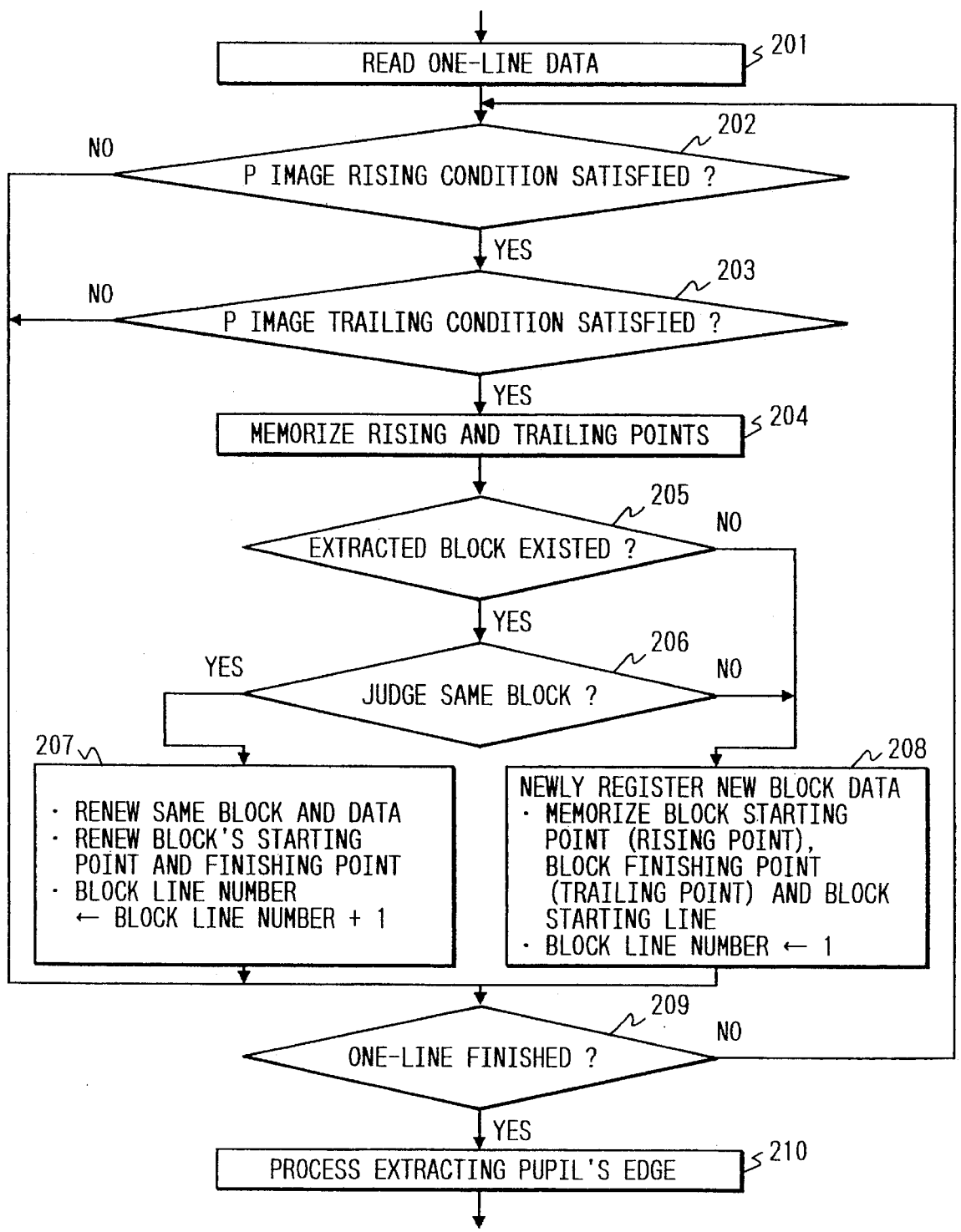
FIG. 3 is a flowchart showing the operation performed in step 107 in FIG. 2.

Now, "extraction of the light image blocks (Purkinje image candidates)" executed in the above-mentioned step 107 will be described with reference to the flowchart of FIG. 3.

In step 201, the MPU 1 reads one line datum. Then, in steps 202 and 203, at first, light image blocks having a luminance greater than a predetermined value are extracted. And then, whether respective light image blocks satisfy rising and trailing conditions or not is judged. More specifically, it is judged whether or not light image blocks having a luminance greater than the predetermined value have rising-and-trailing gradients with a predetermined steepness. Only a light image block width having numbers of pixels larger than a predetermined numbers which have luminance value greater than a predetermined value may be deemed as a valid width.

Now the luminance of the i-th pixel in a certain line is identified by d[i]. If the following conditions:

(1) $d[i] \geq Const1$ AND $d[i] - d[i-a] \geq Const2$ (2) $d[j] \geq Const1$ AND $d[j] - d[j-a] \geq Const2$ wherein Const 1, Const 2 and a are constants, and j is a variable greater than i+1 are satisfied, the above-satisfied one is recognized as a Purkinje image candidate. And in step 204, the i-th pixel is stored as a rising point coordinate, and the j-th pixel as a trailing point coordinate.

In this extraction operation, when sequentially executed from leftwards (from the smallest number of pixel), the first pixel satisfying the above condition (1) is adopted as the rising point coordinate i, while the last pixel satisfying the above condition (2) is adopted as the trailing point coordinate j. Needless to say, it is highly probable that a plurality of light image blocks are present in one line. Therefore, this extraction operation process is executed with respect to all the suitable pixels in that line.

When judging that a light image block is extracted in step 205, whether the newly stored rising and trailing points are the same as those of the previously extracted light image block or not is judged in next step 206. More specifically, when the condition:

[The right boundary of the previously extracted light image block $\leq$ the average value of the right end and the left end of the newly extracted light image block $[(i+j)/2] \leq$ the left boundary of the previously extracted light image block]

is satisfied, the two light image blocks are judged to be the same. In this case, the operation proceeds to step 207, where values of the rising point (the right boundary) of the light image block, the trailing point (the left boundary) of the light image block and the lower boundary (the width in the vertical direction) of the light image block are renewed. The renewal is done as follows:

If $Bnx1 > i$, then $Bnx1 = i$

If $Bnx2 < j$, then $Bnx2 = j$ $Bny2 = Bny2 + 1$ wherein Bny1 is: the coordinate of the upper boundary of the n-th extracted light image block, Bny2: the coordinate of the lower boundary, Bnx1: the coordinate of the left boundary, and Bnx2: the coordinate of the right boundary.

When the newly stored rising and trailing points do not satisfy the above condition, the newly extracted light image block is judged to be a new light image block. In this case, the operation proceeds to step 208, where the coordinate values of the respective boundaries of the light image block are stored as follows:

$Bnx1 = 1$ $Bnx2 = j$

Bny1=the number of the read-out line
Bny2=the number of the read-out line

Further, as a countermeasure against a light image block which is branched or two light image blocks which intermediately combine with each other, duplication process or assimilation process may be executed to the light image blocks.

When a light image block branches, the duplication of the light image block is carried out as follows.

Figure 4A:
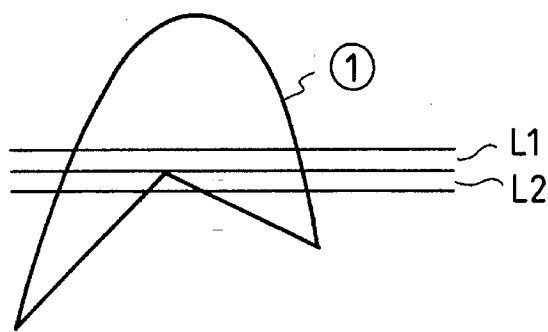
FIGS. 4A and 4B are views showing examples of light image blocks subjected to the duplication process executed in the first embodiment according to the present invention.
Figure 4B:
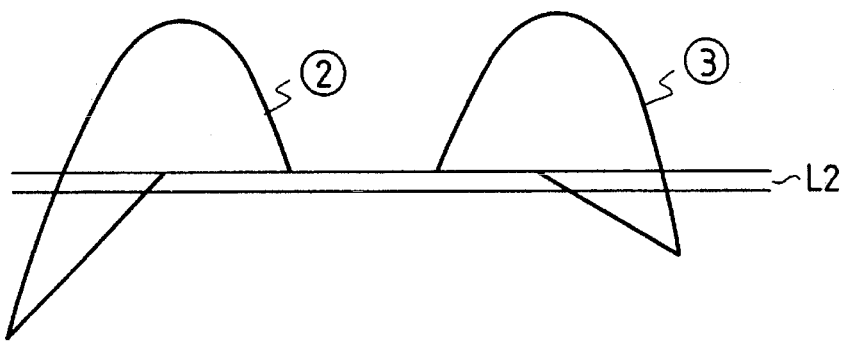

For example, in case of the light image block branched as shown in FIG. 4A (see, the light image block ①), two light image blocks ② and ③ shown in FIG. 4B are generated by duplicating the overlapped region of these light image blocks. More specifically, each of the two light image blocks extracted in the line L2 is recognized as part of the already extracted light image block (the overlapped region of the two light image blocks ② and ③ in FIG. 4B). Therefore, in order to generate the two light image blocks ② and ③ shown in FIG. 4B, said overlap region is added to both of the two light image blocks extracted in the line L2.

In other words, the process is continued as if two light image blocks ② and ③ existed from the beginning, wherein in line L2 the coordinate values of the rising points (the right boundaries) of the light image blocks, the trailing points (the left boundaries) of the light image blocks and the lower boundaries (the width in the vertical direction) of the light image blocks are renewed as follows:

If $Bnx1 > i$, then $Bnx1 = i$

If $Bnx2 < j$, then $Bnx2 = j$ $Bny2 = Bny2 + 1$ wherein Bny1 is: the coordinate of the upper boundary of respective overlap regions, Bny2: the coordinate of the lower boundary, Bnx1: the coordinate of the left boundary, and Bnx2: the coordinate of the right boundary. Similar renewal is executed with respect to each boundary value in the lines below the line L2.

Thus, as to the example shown in FIG. 4B, the left and lower boundary value of the light image block ② and the right and lower boundary value of the light image block ③ are renewed.

When the light image blocks are combined with each other, the assimilation of these light image blocks is carried out as follows.

Figure 5:
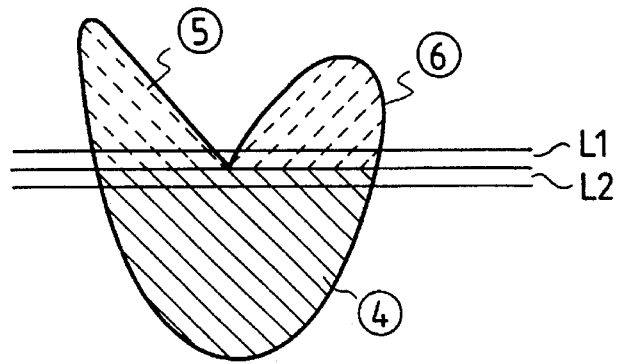
FIG. 5 is a view showing an example of a light image block subjected to the assimilation process executed in the first embodiment according to the present invention.

For example, in case two light image blocks are combined with each other as shown in FIG. 5, the light image block ④ extracted in the line L2 assimilates the two light image blocks ⑤ and ⑥ which have been extracted separately until the line L1 to be unified as one light image block. More specifically, in the line L2, the values of the rising point (the right boundary) of the light image block, the trailing point (the left boundary) of the 10 light image block and the lower boundary (the width of the light image block in the vertical direction) are renewed as follows:

If $Bax1 > i$, the $Bnx1 = i$

If $Bax1 \leq i$, then $Bnx1 = Bax1$

If $Bbx2 < j$, then $Bnx2 = j$

If $Bbx2 \geq j$, then $Bnx2 = Bbx2$

If $Bay1 < Bby1$, then $Bnx2 = Bay1$

If $Bay1 \geq Bby1$, then $Bnx2 = Bby1$ $Bny2 = Bay2 + 1 = Bby2 + 1$ wherein Bay1 is the coordinate of the upper boundary of the light image block ⑤, Bay2: the coordinate of the lower boundary, Bax1: the coordinate of the left boundary and Bax2: the coordinate of the right boundary. Bby1 is: the coordinate of the upper boundary of the light image block ⑥, Bby2: the coordinate of the lower boundary, Bbx1: the left boundary and Bbx2: the coordinate of the right boundary. Bny1 is: the coordinate of the upper boundary of the newly extracted light image block, Bny2: the coordinate of the lower boundary, Bnx1: the coordinate of the left boundary and Bnx2: the coordinate of the right boundary. In the lines below the line L2, the normal extraction process is carried out with respect two thus assimilated light image block, whose boundary values are renewed as described above.

Only one of the above-mentioned duplication process and the assimilation process may be performed. Or, both of them may be performed.

If the operation of one line is judged to be finished in step 209, the operation proceeds to step 210, where the pupil's edge extraction process is performed.

Figure 6B:
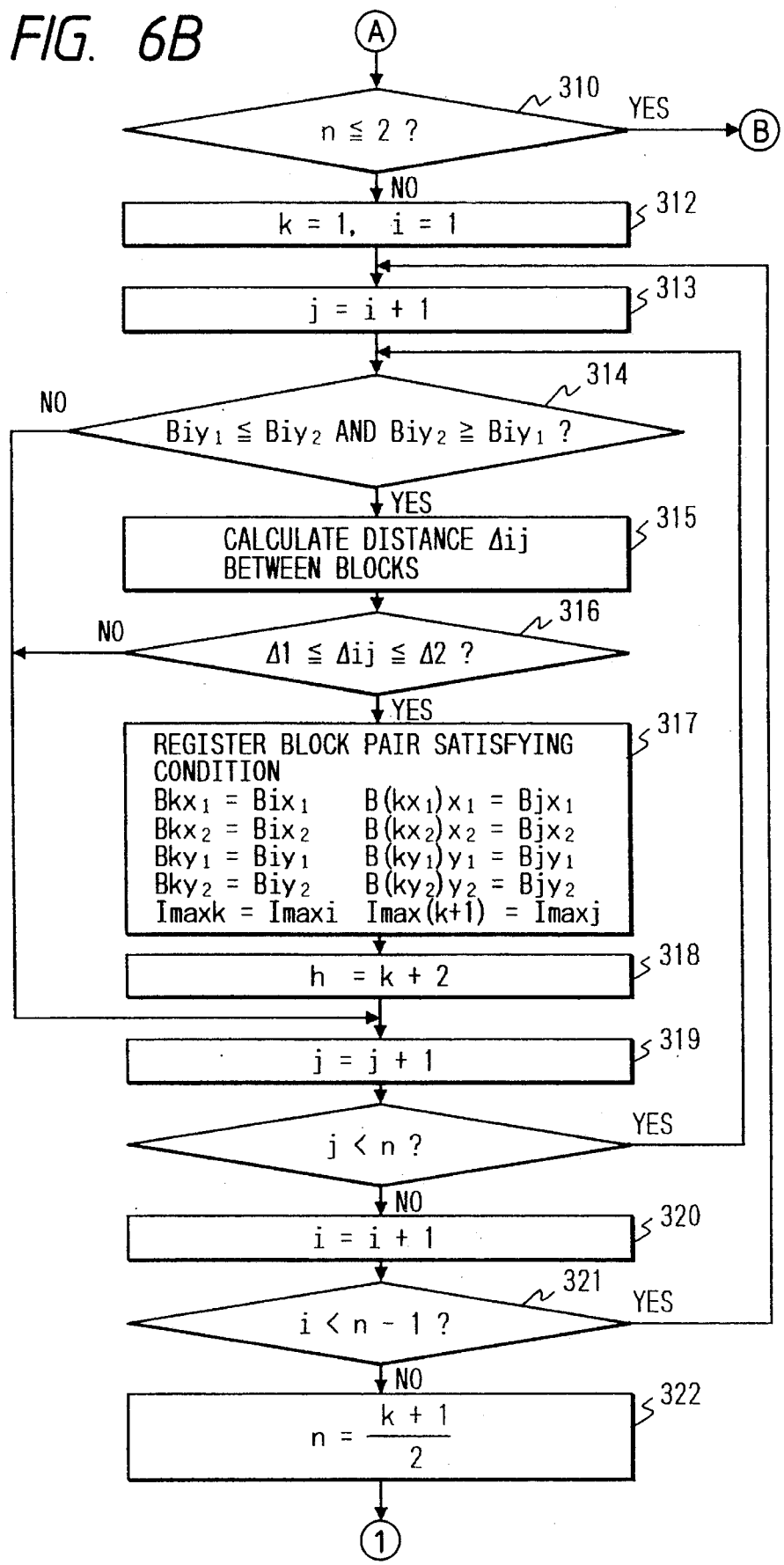
FIG. 6 which is comprised of FIGS. 6A and 6B is a flowchart for selecting a proper image as the Purkinje image according to the present invention.
Figure 7:
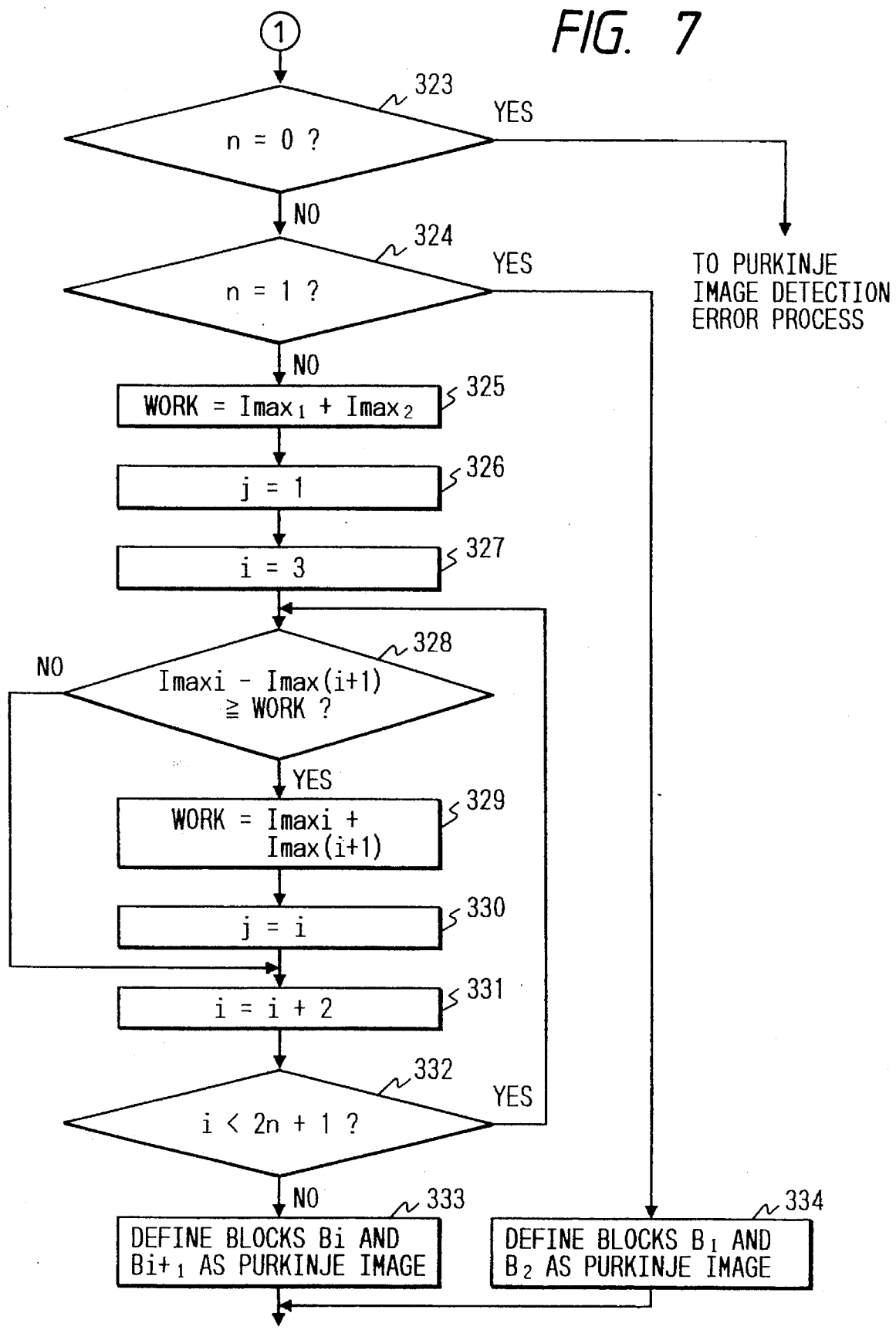
FIG. 7 is a flowchart continued from FIG. 6B.

Returning to step 108 in FIG. 2, when the process of all the lines is judged to be finished, the operation proceeds to step 109, where the "Purkinje image selection" process starts. FIGS. 6A, 6B and 7 are flowcharts shown for this Purkinje image selection operation.

In the first phase of the process, the width (size) of each light image block is examined in the horizontal and the vertical directions, and the light image block whose widths are equal to or smaller than a constant value, Const 3 in both horizontal and vertical directions, that is, small light image blocks are adopted and registered (step 306). The light image blocks having larger widths are supposed to be light image blocks other than the Purkinje image, such as a ghost image generated in the glasses, the outdoor daylight reflected by the eyelid, and the like, therefore are excluded.

In the second phase of the process, the coordinates in the vertical direction of the light image blocks adopted in the first phase of the process are examined. If two light image blocks are overlapped or are in contact with each other on a line in the vertical direction, the coordinates in the vertical direction of these two light image blocks are judged to be substantially the same. More specifically, when the following conditional expressions:

$Bny1 \leq Bmy2$, and $Bny2 \geq Bmy1$ wherein Bny1 is: the upper boundary position of the n-th light image block, Bny2: the lower boundary position, Bnx1: the left boundary position and Bnx2: the right boundary position. Bmy1 is: the upper boundary position of the m-th light image block, Bmy2: the lower boundary position, Bmx1: the left boundary position and Bmx2: the right boundary position, are satisfied, the coordinates of the vertical direction of the two light image blocks are judged to be substantially the same. Subsequently, the light image blocks whose coordinates in the vertical direction do not substantially coincide with those of the other light image blocks are excluded. After that, the distances Δmn between the light image blocks having substantially the same coordinates in the vertical direction are examined. And if a distance of two light image blocks are within a predetermined range ($\Delta1 \leq \Delta mn \leq \Delta2$), only the two light image blocks are adopted, wherein Δ1 and Δ2 are constants.

For example, in case that three light image blocks B1, B2 and B3 have substantially the same coordinate in the vertical direction, whether the distance Δ12 between B1 and B2 is within the predetermined range of values or not is examined. Similarly the distance Δ23 between B2 and B3, and the distance Δ31 between B3 and B1 are examined. If, for example, Δ12 and Δ23 are within the predetermined range of values two pairs [B1, B2] and [B2, B3] are adopted as Purkinje image candidate pairs. At this time, if only one pair is adopted as the Purkinje image candidate pair (that is, only two light image blocks are adopted), said pair is adopted as the Purkinje image (step 317). On the contrary, if the Purkinje image still cannot be determined, the following process is carried out.

In the third phase of the process, the coordinates of the centers of respective Purkinje image candidate pairs are compared with the coordinates of the center of the pupil which are obtained independent of the coordinates of the Purkinje image candidate pairs. And the pair nearest to the coordinates of the pupil's center, that is, the Purkinje image candidate pair whose center is nearest to the pupil's center may be selected as the Purkinje image. Otherwise, the other selection may be carried out as follows.

For example, suppose two pairs of light image blocks, B1 and B2, and B3 and B4, have been selected at the end of the second phase of the process. Values of (Imax1+Imax2) and (Imax3+Imax4) are calculated. And if (Imax1+Imax2)≧(Imax3+Imax4), the light image blocks B1 and B2 are adopted as the Purkinje image, while if (Imax1+Imax2)<(Imax3+Imax4), the light image blocks B3 and B4 are adopted as the Purkinje image (wherein Imax1, Imax2, Imax3 and Imax4 are maximum luminances of the light image blocks B1, B2, B3, and B4, respectively).

Or, average values of the maximum luminance of the light image blocks forming respective Purkinje image candidate pairs may be compared with each other to select the pair having the maximum average value.

The coordinates of the Purkinje candidate pair of the light image blocks P1 and P2 determined as described above, and the coordinates of the Purkinje image Pc are calculated as follows.

$$P1x=(Bnx1+Bnx2)/2$$

$$P1y=(Bny1+Bny2)/2$$

$$P2x=(Bmx1+Bmx2)/2$$

$$P2y=(Bmy1+Bmy2)/2$$

$$Pcx=(P1x+P2x)/2$$

$$Pcy=(P1y+P2y)/2$$

wherein P1x is: the horizontal coordinate of the light image block P1 forming the Purkinje image candidate pair, P1y: the vertical coordinate of P1, P2x: the horizontal coordinate of the light image block P2 forming the Purkinje image candidate pair, P2y: the vertical coordinate of P2, Pcx: the horizontal coordinate of the Purkinje image Pc, and Pcy: the vertical coordinate of Pc. Note that the n-th and the m-th light image blocks are selected as the components of the Purkinje image.

Figure 11B:
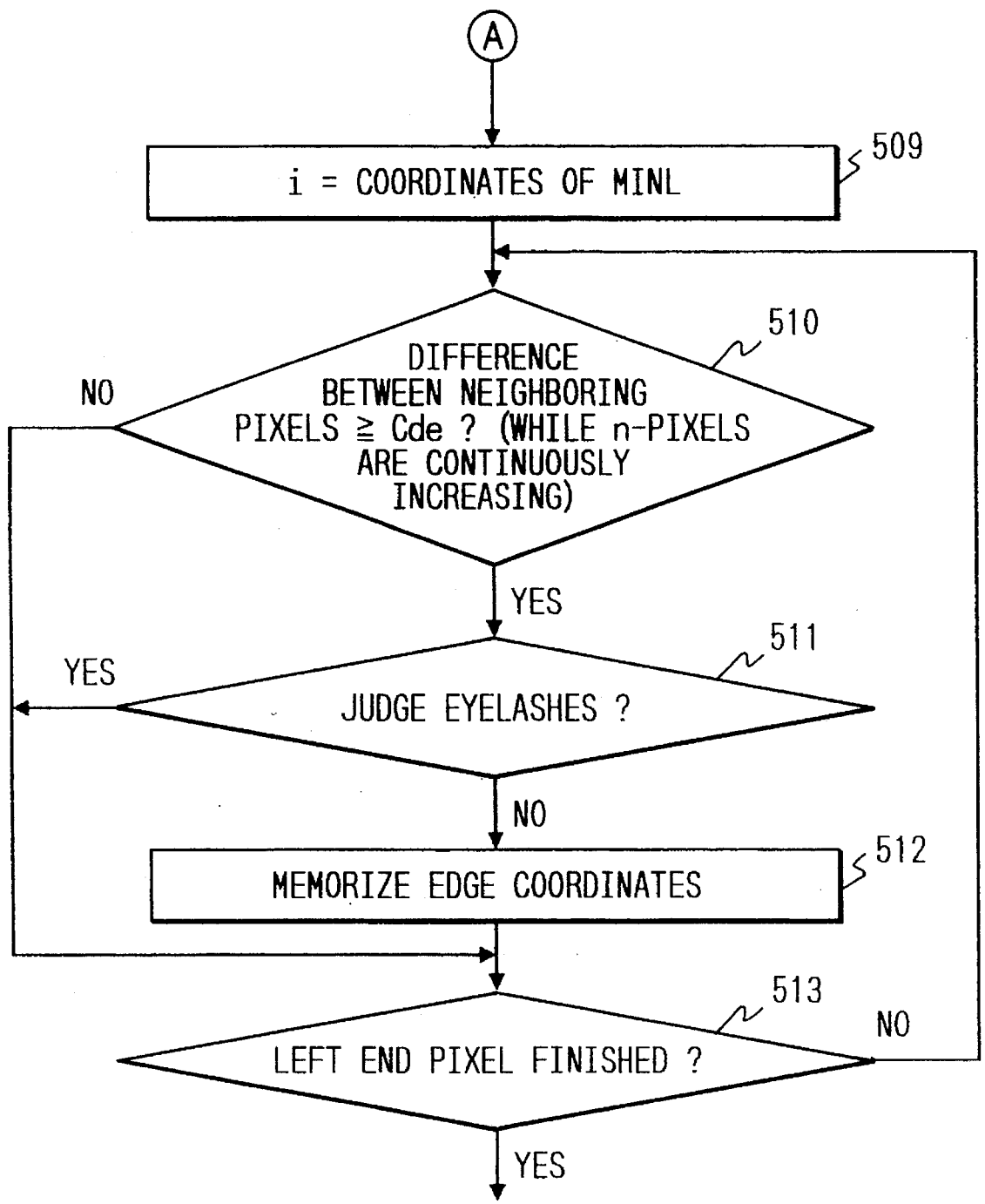
FIG. 11 which is comprised of FIGS. 11A and 11B is a flowchart showing pupil's edge extraction operation in the camera equipped with the apparatus according to the present invention.
Figure 12:
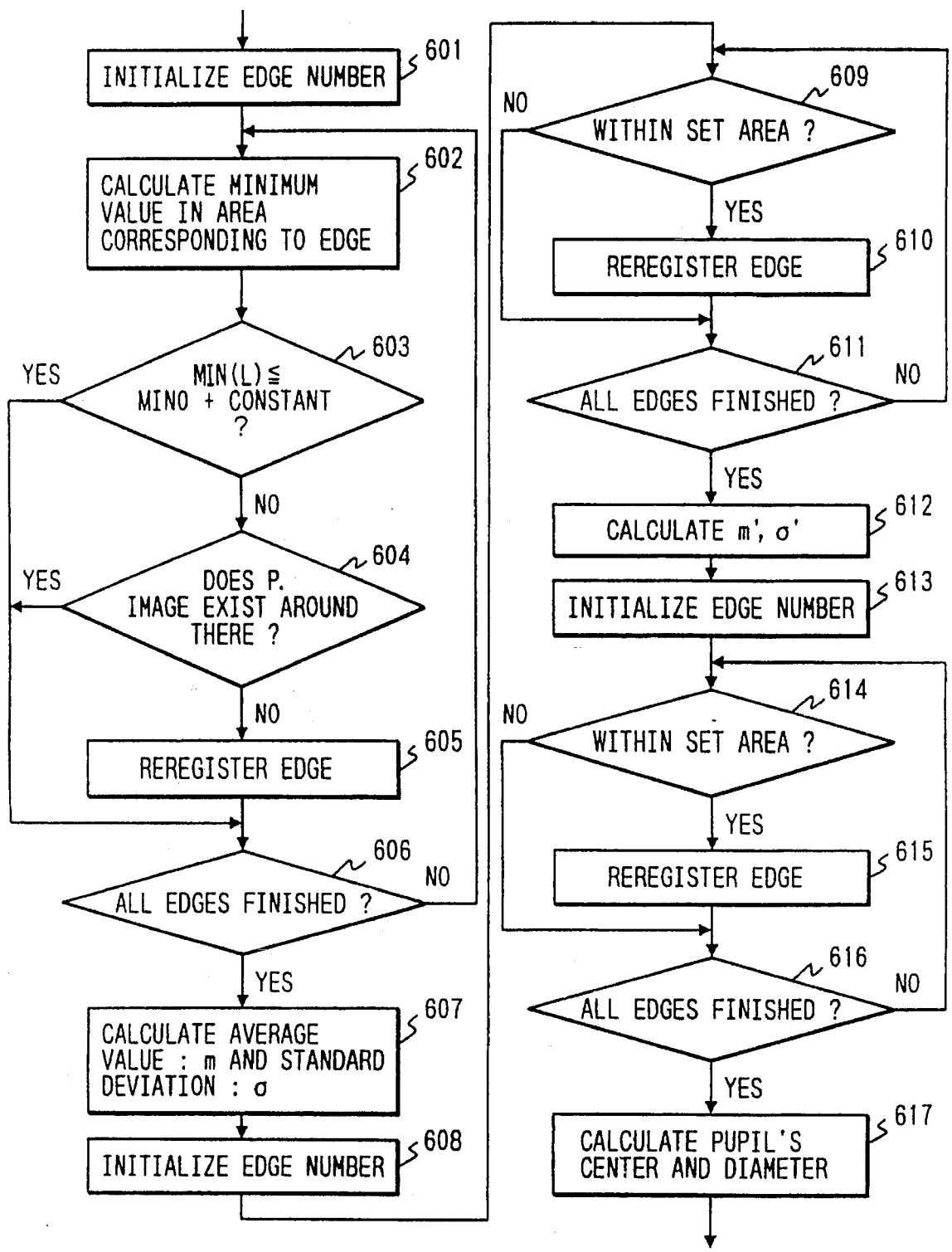
FIG. 12 is a flowchart continued from FIG. 11B.
Figure 13:
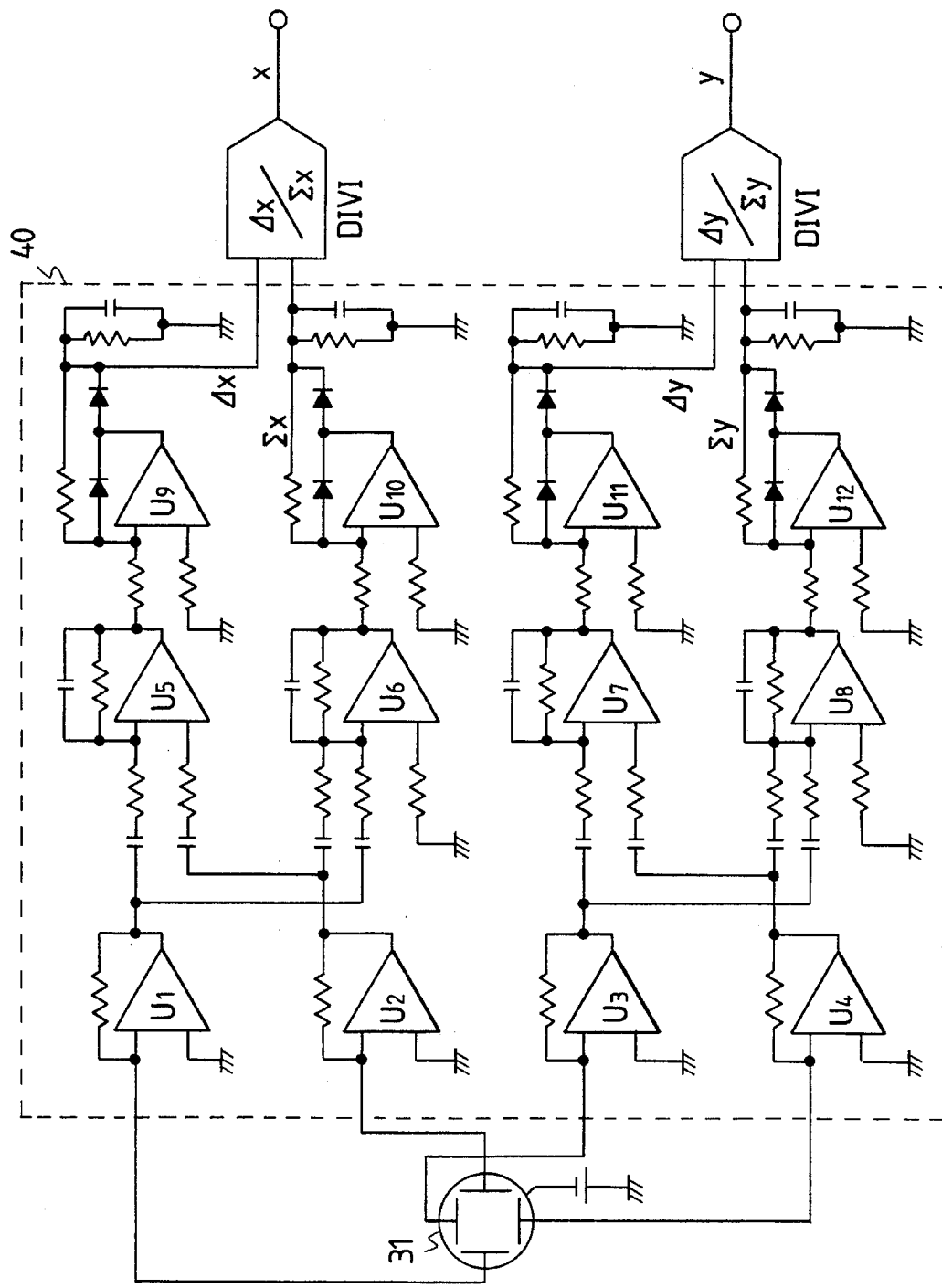
FIG. 13 is a circuit diagram showing a main constitution of a conventional visual axis detection apparatus.

Next, the operation proceeds to step 110, where calculation for the pupil's circle is obtained as follows. FIGS. 11A, 11B and 12 are flowcharts for this operation.

First, in step 501, the MPU 1 reads data on the line sensor, and in step 502, obtains the minimum value MINL and its position (coordinates) from the data. And in step 503, the sensor is divided in the horizontal direction, and the minimum values in respective divided areas are obtained.

Subsequently, from step 504, extraction of the pupil's edge in the horizontal direction starts from the coordinates of the minimum value MINL.

At first, in step 505, the value of the counter is decreased to detect the left pupil's edge. And whether the output signal monotonously decreases over n pixels or not is examined. In other words, whether the expression;

$$d\,[j]<d\,[j-l]<d\,[j-1]<\ldots\ldots<d\,[j-(n-1)]<d\,[j-n]$$

is satisfied or not is examined. In order to obtain the length D of the slope, enumeration is continued as long as the output signal monotonously decreases. Secondary, whether all the differences, in the entire slope, between the neighboring pixels, for example, the values (d[j−n]−[d j]), (d[j−n]−d[j−(n−1)]), and so on are equal to or greater than a predetermined value Cde or not is examined. By doing this, the slope which arises with a gradient greater than the predetermined value from the pupil region whose signal intensity is substantially the same as the minimum value (slope of the pupil's edge) can be detected.

Thirdly, in step 506, a process for excluding the influence of eye lashes on the luminance change is carried out.

Figure 14:
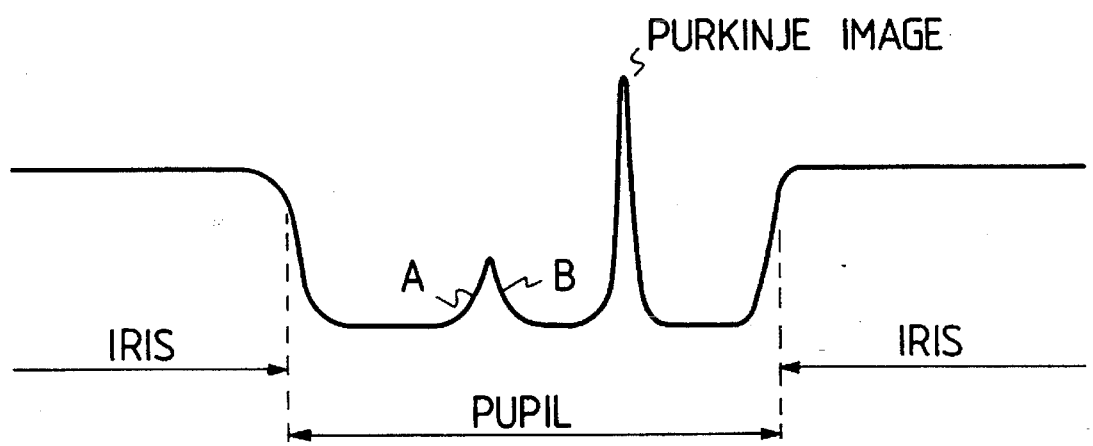
FIG. 14 is a view showing the state of output of a line.

An example of the luminance change caused by the eye lashes is shown in FIG. 14. As understood from the drawing, whether a detected edge is caused by the eye lashes or not can be judged by examining whether the up-edge A has the corresponding down-edge B immediately after the up-edge A.

If the above three conditions are satisfied, the vicinity of the pixel (j−2D) (for example, pixels (j−2D±a few numbers of pixels)) are examined. 10 And when a value which is substantially the same as the minimum value (MIN) is found, the luminance change is judged to be caused by the eye lashes.

The output signal satisfying the above three conditions can be regarded as the pupil's edge. And in step 507, the pixel number (j+j−D)/2 is stored in the memory 2 as the left pupil's edge datum.

The MPU 1 carries out the above-mentioned series of the process until the effective range of the line sensor ends (step 508). After that, the MPU 1 proceeds to step 509, where the routine for detecting the other side (right side) of the pupil's edge starts.

The routine for detecting the other side (right side) of the pupil's edge (from step 509 to step 513) is similarly carried out.

More specifically, if each of the following conditions:
(1) The output signal monotonously increases over n numbers of pixels (in this case, the length of the slope D is counted);
(2) All the differential distances between neighboring pixels in the slope are equal to or greater than the predetermined value Cde; and
(3) There is not a down-edge immediately after an up-edge (which means that the luminance change is not that caused by the eye lashes);

is satisfied, the position concerned is judged to be a pupil's edge. And the line number L and the pixel number (j+j+D) are stored in the memory 2 as the right pupil's edge datum. This process is continued until the effective range ends.

Next, the MPU 1 compares the minimum luminance (MIN(L)) of the line subjected to the extraction of the pupil's edge with the minimum luminance (MIN0 a predetermined value) in the entire image. If the condition:

MIN (L)≦MIN0+the predetermined value is not satisfied, the supposed pupil's edge in that area is judged to be improper, and is excluded STEP 603.

Subsequently, the supposed pupil's edge in the vicinity of the Purkinje image (candidates) obtained by step 109, that is, by the first and the second phases of the above-mentioned Purkinje image selection process, is excluded. More specifically, the supposed pupil's edge within the area whose center has the same horizontal and vertical coordinates (Pnx, Pny) as the Purkinje image candidates (light image blocks) is excluded. For example, supposed pupil's edge within a quadrilateral whose vertexes have coordinates (Pnx−a constant, Pny−a constant), (Pnx−a constant, Pny+a constant), (Pnx+a constant, Pny−a constant) and (Pnx+a constant, Pny+a constant) is excluded. As there are two Purkinje image candidates, the above exclusion process is executed on each of the Purkinje image candidates.

Further, the average value m and the standard deviation σ of the coordinates of the theretofore selected pupil's edge candidates are calculated, and only those within the range of [the average value m±a * standard deviation σ] are obtained (wherein a is a constant).

The above calculation may be carried out with respect to only the horizontal direction or both the horizontal and vertical directions. Also, this calculation process may be doubly performed. That is, at first the pupil's edge candidates which are within the range of [the average value m±a * standard deviation σ] is screened. Then, the average value m' and the standard deviation σ' of the screened pupil's edge candidates are calculated. Subsequently, only those within a range determined by thus calculated values, that is, within a range of [the average value m'+a * standard deviation] are adopted.

Next, the pupil's center and the pupil's radius are obtained according to the pupil's edge selected as described above, which can be carried out by the least square approximation.

After that, the operation proceeds to step 111, where the angle of rotation of the eyeball as well as the view point position on an imaging plate of the camera is calculated on the basis of the positions of the Purkinje image and the pupil's center. And in step 112, the AF point, and so on are determined on the basis of thus calculated view point position in order to control the camera.

Now, FIG. 8 shows a flowchart for detecting the Purkinje image exactly according to another method.

Here, the luminance of the i-th pixel in a certain line is indicated by d [i]. If the following conditions:

(1) $d[i] \geq Const\ 1$ and $d[i]-d[i-a] \geq Const\ 2$ (2) $d[j] \geq Const\ 1$ and $d[j]-d[j-a] \geq Const\ 2$ wherein Const 1, Const 2 and a are constants, and j is a variable equal to or greater than i+1 are satisfied, the light image block from the i-th pixel to the j-th pixel is recognized as a Purkinje image candidate. And in step 304a, the i-th pixel is stored as a rising point coordinate, and the j-th pixel as a trailing point coordinate.

In this extraction operation, when executed from leftwards (from the pixel of the smallest number), the first pixel satisfying the above condition (1) is adopted as the rising point coordinate i, while the last pixel satisfying the above condition (2) is adopted as the sitting point coordinate j. Needless to say, it is highly probable that a plurality of light image blocks are present in one line. Therefor, this extraction operation process is executed with respect to all the suitable pixels in that line.

When a light image block is judged to have been extracted in step 305a, whether the newly stored rising and trailing points are the same as those of the previously extracted light image block or not is judged in step 306a. More specifically, when the condition:

[The right boundary of the previously extracted light image block$\leq$the average value of the right end and the left end of the newly extracted light image block [(i+j)/2]$\leq$the left boundary of the previously extracted light image block]

is satisfied, the two light image blocks are judged to be the same. In this case, the operation proceeds to step 307a, where values of the rising point (the right boundary) of the light image block, the trailing point (the left boundary) of the light image block and the lower boundary (the width in the vertical direction) of the light image block are renewed. The renewal is done as follows:

If $Bnx1 > i$, then $Bnx1 = i$

If $Bnx2 < j$, then $Bnx1 = j$ $Bny2 = Bny2 + 1$ wherein Bny1 is: the coordinate of the upper boundary of the n-th extracted block, Bny2: the coordinate of the lower boundary, Bnx1: the coordinate of the left boundary, and Bnx2: the coordinate of the right boundary.

Further, the sum SI[n] of the luminance (signal intensity) of the image signals within said boundaries, the sum of product SIx[n] of the luminance and the horizontal coordinates, and the sum of product SIy[n] of the luminance and the vertical coordinates are renewed and stored. The renewal is carried out as follows:

$SI[n] = SI[n] + \Sigma(d[x])$ $SIx[n] = SIx[n] + \Sigma(d[x] * x)$ $SIy[n] = SIy[n] + \Sigma(d[x]$ * the line number L of the line which is being processed)

When the newly stored standing and sitting points do not satisfy the above condition, the newly extracted light image block is judged to be a new light image block. In this case, the operation proceeds to step 308a, where the coordinate values of the respective boundaries are stored as follows:

$Bnx1 = i$ $Bnx2 = j$

Bny1 as the number of the line which is read
Bny2 as the number of the line which is read Further, the sum SI[n] of the luminance (signal intensity) of the image signals within said boundaries, the sum of product SIx[n] of the luminance and the horizontal coordinates, and the sum of product SIy[n] of the luminance and the vertical coordinates are renewed and stored. The renewal is carried out as follows:

$SI[n] = \Sigma(d[x])$ $SIx[n] = \Sigma(d[x] * x)$ $SIy[n] = \Sigma(d[d[x]$ * the line number L of the line which is being processed)
wherein the rising point $i \leq x \leq$ the trailing point j.

At this time information as for the upper and lower line may be added with data.

In this case, at first, when a new light image block is judged to be present, the coordinates of respective boundaries are stored as described before. And at the same time, the sum SI[n] of the luminance (signal intensity) of the image signals within said boundaries, the sum of product SIx[n] of the luminance and the horizontal coordinates, and the sum of product SIy[n] of the luminance and the vertical coordinates are obtained as follows and the resultant values are stored; that is:

$SI[n] = \Sigma(d[x]) + \Sigma(e[x])$ $SIx[n] = \Sigma(d[x] * x) + \Sigma(e[x]x)$ $SIy[n] = \Sigma(d[x]$ * the line number L of the line which is being processed)$+\Sigma(e[x] * (L-1))$ wherein e[x] is the luminance of the i-th pixel in the line L-1 which is just before the line L being processed, and x ranges from the standing point i of the line L which is being processed to the sitting point j thereof.

In case a light image block (which is a Purkinje image candidate) is detected in the previous line L-1, even if another light image block is not detected, the sum SI[n] of the luminance (signal intensity) of the image signals within the range of said detected light image block, the sum of product SIx[n] of the luminance and the horizontal coordinates, and the sum of product SIy[n] of the luminance and the vertical coordinates are obtained as follows, and the obtained values are stored. That is:

$SI[n] = SI[n] + \Sigma(d[x])$ $SIx[n] = SIx[n] + \Sigma(d[x] * x)$ $SIy[n] = SIy[n] + \Sigma(d[x]$ * the line number L of the line which is being processed)

If a plurality of light image blocks have been detected, the sum SI[n] of the luminance, the sum of product SIx[n] of the luminance and the horizontal coordinates, and the sum of product SIy[n] of the luminance and the vertical coordinates are renewed and stored with respect to each of said detected light image block.

Further, as a countermeasure against a light image block which is branched or light image blocks which intermediately are combined with each other, duplication process or assimilation process is executed to the light image block(s).

For example, in case the light image block are branched as shown in FIG. 4A (see the light image block ①), two light image blocks ② and ③ shown in FIG. 4B are generated by duplicating the overlapped region of these light image blocks. More specifically, each of the two light image blocks extracted in the line L2 is recognized as part of the already extracted light image block (the overlapped region of the two light image blocks ② and ③ in FIG. 4B). Therefore, in order to generate the two light image blocks ② and ③ shown in FIG. 4B, said overlapped region is added to both of the two light image blocks extracted in the line L2.

In other words, the process is continued as if two light blocks ② and ③ existed from the beginning, wherein in line L2 the coordinate values of the rising points (the right boundaries) of the light image blocks, the trailing points (the left boundaries) of the light image blocks and the lower boundaries (the width in the vertical direction) of the light image blocks are renewed as follows:

If $Bnx1 > i$, then $Bnx1 = i$

If $Bnx2 < j$, then $Bnx2 = j$ $Bny2 = Bny2 + 1$ wherein Bny1 is: the coordinate of the upper boundary of the overlap region, Bny2: the coordinate of the lower boundary, Bnx1: the coordinate of the left boundary, and Bnx2: the coordinate of the right boundary.

Further, the sum SI[n] of the luminance (signal intensity) of the image signals within said boundaries, the sum of product SIx[n] of the luminance and the horizontal coordinates, and the sum of product SIy[n] of the luminance and the vertical coordinates are renewed and stored. The renewal is carried out as follows:

$SI[n] = SI[A] + \Sigma(d[x])$ $SIx[n] = SIx[A] + \Sigma(d[x] * x)$

SIy[n]=SIy[A]+Σ(d[x]* the line number L of the line which is being processed)
wherein the rising point $i \leq x \leq$ the sitting point j, SI[A] is the sum of the luminance of the overlapped region, SIx[A] is the sum of product of the luminance and the horizontal coordinates, and SIy[A] is the sum of the product of the luminance and the horizontal coordinates.

The values of respective boundaries, the sum SI[n] of the luminance, the sum of product SIx[n] of the luminance and the horizontal coordinates and the sum of product SIy[n] of the luminance and the vertical coordinates are similarly renewed with respect to the line L2 and the lines below it.

When the two light image blocks are combined with each other, the assimilation of these light image blocks is carried out.

For example, in case two image blocks are combined with each other as shown in FIG. 5, the light image block ④ extracted in the line L2 is integrated as the two light image blocks ⑤ and ⑥ which have been extracted separately until the line L1 to be unified as one light image block. More specifically, in the line L2, the values of the rising points (the right boundary) of the light image block, the trailing point (the left boundary) of the light image block and the lower boundary (the width in the vertical direction) of the light image block are renewed as follows:

If $Bax1 > i$, then $Bnx1 = i$

If $Bax1 \leq i$, then $Bnx1 = Bax1$

If $Bbx2 - j$, then $Bnx2 = j$

If $Bbx2 \geq j$, then $Bnx2 = Bbx2$

If $Bay1 < Bby1$, then $Bnx2 = Bay1$

If $Bay1 \geq Bby1$, then $Bnx2 = Bby1$ $Bny2 = Bay2 + 1 = Bby2 + 1$ wherein Bay1 is: the coordinate of the upper boundary of the light image block ⑤, Bay2: the coordinate of the lower boundary, Bax1: the coordinate of the left boundary and Bax2: the coordinate of the right boundary. Bby1 is: the coordinate of the upper boundary of the light image block ⑥, Bby2: the coordinate of the lower boundary, Bbx1: the left boundary and Bbx2: the coordinate of the right boundary. Bny1 is: the coordinate of the upper boundary of the newly extracted light image block, Bny2: the coordinate of the lower boundary, Bnx1: the coordinate of the left boundary and Bnx2: the coordinate of the right boundary.

Further, the sum SI[n] of the luminance (signal intensity) of the image signals within said boundaries, the sum of product SIx[n] of the luminance and the horizontal coordinates, and the sum of product SIy[n] of the luminance and the vertical coordinates are renewed and stored. The renewal is carried out as follows:

$SI[n] = SI[A] + SI[B] + \Sigma(d[x])$ $SIx[n] = SI[A] + SI[B] + \Sigma(d[x] * x)$ SIy[n]=SI[A]+SI[B]+Σ(d[x] * the line number L of the line which is being processed)
wherein the rising point $i \leq x \leq$ the trailing point j, SI[A] is: the sum of the luminance of the light image block A, SIx[A]: the sum of product of the luminance and the horizontal coordinates of the light image block A, SIy[A]: the sum of product of the luminance and the vertical coordinate of the light image block A. SI[B] is: the sum of the luminance, SEx[B]: the sum of product of the luminance and the horizontal coordinates and SIy[B]: the sum of product of the luminance and the vertical coordinates, of the light image block B.

With respect to the line L2 and the lines below it, normal light image block extraction process is performed on the assimilated light image block, wherein the values of respective boundaries of the light image block, the sum SI[n] of the luminance, the sum of product SIx[n] of the luminance and the horizontal coordinates and the sum of product SIy[n] of the luminance and the vertical coordinates are renewed as described before.

Only one of the above-mentioned duplication process and the assimilation process may be performed. Or, both of them may be performed.

If the operation of one line is judged to be finished in step 309a, the operation proceeds to step 310a, where the pupil's edge extraction process is performed.

Figure 9B:
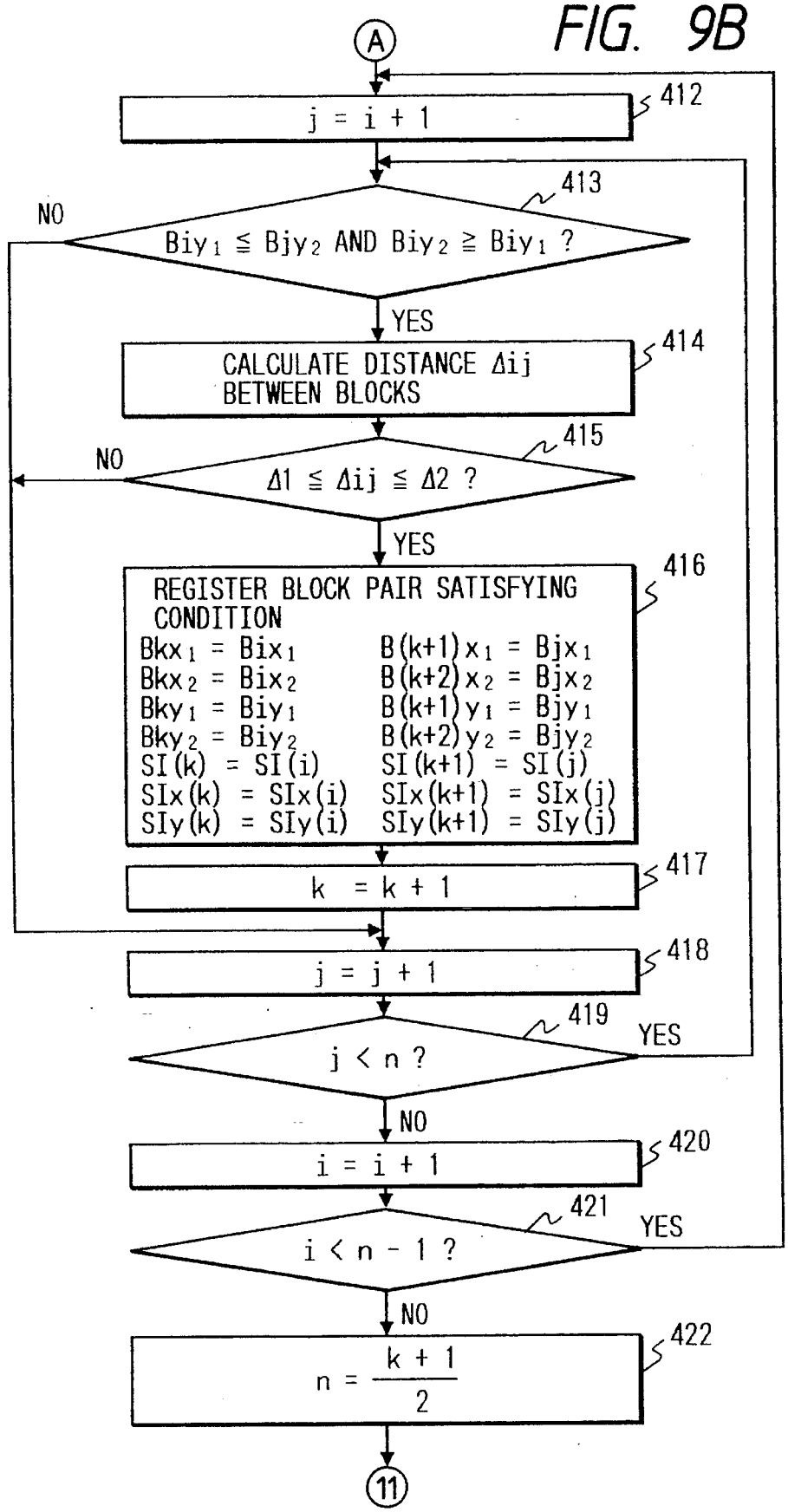
FIG. 9 which is comprised of FIGS. 9A and 9B is a flowchart for selecting an image suitable as the Purkinje image according to the present invention.
Figure 10:
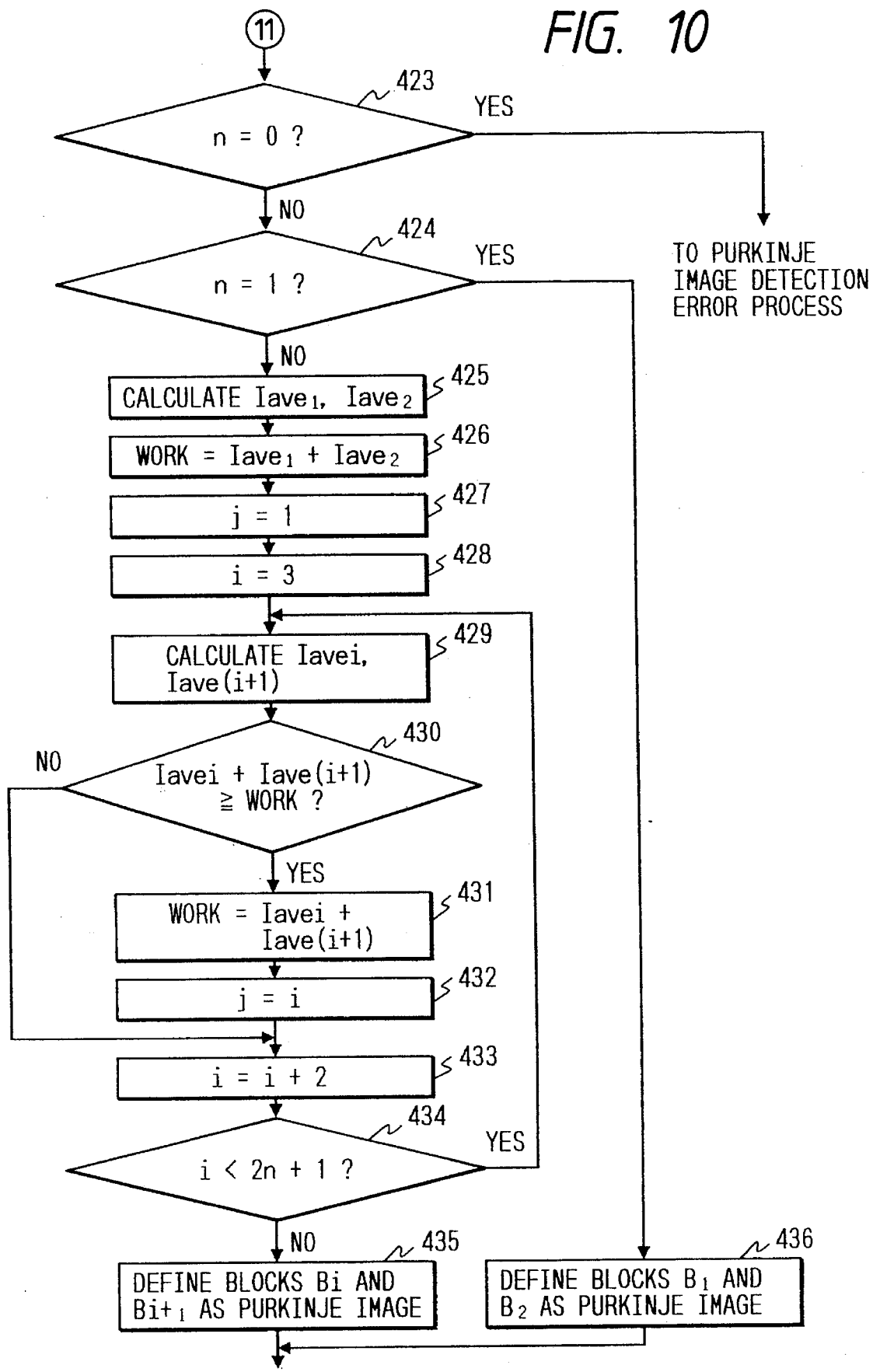
FIG. 10 is a flowchart continued from FIG. 9B.

Returning to step 108 in FIG. 2, when the process of all the lines is judged to be finished, the operation proceeds to step 109, where the Purkinje image selection process is started. FIGS. 9A, 9B and are flowcharts shown for this process.

In the first phase of this process, the width of each light image block is examined in the horizontal and the vertical directions, and the light image blocks whose widths are equal to or smaller than the constant Const 3 in both horizontal and vertical directions are adopted. The light image blocks having larger widths are supposed to be light image blocks other than the Purkinje image, such as a ghost image generated in the glasses, the light coming from outside reflected by the eyelid, and the like, and therefore are excluded.

In the second phase of the process, the coordinates in the vertical direction of the light image blocks adopted in the above first phase of the process are examined. If two light image blocks are overlapped or are in contact with each other in the vertical direction, the coordinates in the vertical direction of these two light image blocks are judged to be substantially the same. More specifically, when the following conditional expressions:

$$Bny1 \leq Bmy2, \text{ and } Bny2 \geq Bmy1$$

wherein Bny1 is: the upper boundary position of the n-th light image block, Bny2: the lower boundary position thereof, Bnx1: the left boundary position and Bnx2: the right boundary position. Bmy1 is: the upper boundary position of the m-th light image block, Bmy2: the lower boundary position thereof, Bmx1: the left boundary position and Bmx2: the right boundary position, are satisfied, the coordinates of the vertical direction of the two light image blocks are judged to be substantially the same. Subsequently, the light image blocks whose coordinates in the vertical direction do not substantially coincide with these of the other light image blocks are excluded. After that, the distances Δmn between the light image blocks having substantially the same coordinates in the vertical direction are examined. And if a distance of two image blocks are within the predetermined range ($\Delta 1 \leq \Delta mn \leq \Delta 2$), the two light image blocks are adopted, wherein Δ1 and Δ2 are constants. At this time, if only one pair is adopted as the Purkinje image candidate pair (that is, only two light image blocks are adopted), said pair is adopted as the Purkinje image. On the contrary, if the Purkinje image still cannot be determined, the following process is carried out.

In the third phase of the process, at first, the average values of the maximum luminance values of respective Purkinje image candidate pairs are obtained and compared with each other. Then, the pair whose average value of the maximum luminance values is greatest is selected as the Purkinje image.

For example, suppose two pairs of light image blocks, B1 and B2, and B3 and B4, have been selected at the end of the second phase of the process. The average value of the luminance Iave1, Iave2, Iave3 and Iave4, respectively of the light image blocks B1, B2, B3 and B4 are calculated as follows:

$$Iave1 = SI[1]/[(B1x2-B1x1+1)*(B1y2-B1y2+1)]$$

$$Iave2 = SI[2]/[(B2x2-B2x1+1)*(B2y2-B3x1+1)]$$

$$Iave3 = SI[3]/[(B3x2-B3x1+1)*(B3y2-B3y2+1)]$$

$$Iave4 = SI[4]/[(B4x2-B4x1+1)*(B4y2-B4y2+1)$$

Then, (Iave1+Iave2) and (Iave3+Iave4) are compared with each other. If (Iave1+Iave2)≧(Iave3+Iave4), then the light image blocks B1 and B2 are adopted as the Purkinje image, while if (Iave1+Iave2)<(Iave3+Iave4), then the light image blocks B3 and B4 are adopted as the Purkinje image.

Also, the average values of the maximum luminance values of respective pairs of Purkinje image candidates may be compared.

The coordinates of the light blocks P1 and P2 forming the adopted Purkinje image candidate pair determined as described above and of the Purkinje image Pc are calculated as follows:

$$P1x = SIx[n]/SI[n]$$

$$P1y = SIy[n]/SI[n]$$

$$P2x = SIx[m]/SI[m]$$

$$P2y = SIy[m]/SI[m]$$

$$Pcx = (P1x + P2x)/2$$

$$Pcy = (P1y + P2y)/2$$

wherein P1x is: the coordinate in the horizontal direction of the light image block P1 of the adopted Purkinje image candidate pair, P1y: the coordinate in the vertical direction of P1, P2x: the coordinate in the horizontal direction of the light image block P2 of the adopted Purkinje image candidate pair, P2y: the coordinate in the vertical direction of P2, Pcx: the coordinate in the horizontal direction of the Purkinje image Pc, and Pcy: the coordinate in the vertical direction of the Purkinje image Pc, and n-th and m-th light image blocks are selected as the Purkinje image.

Next, in step 110, the pupil's circle is calculated in the same way as described before.

As described above, since the centers of gravity of the light image blocks (forming the Purkinje image candidate pairs) are obtained on the basis of the sum of the luminance, the sum of the product of the luminance and the horizontal coordinates and the sum of product of the luminance and the vertical coordinates, the position of the center of the Purkinje image can be calculated with resolution power higher than that of pixel unit.

As described above, according to the present invention, the Purkinje image extraction means contains: the Purkinje image candidate storage means for detecting the light images having luminance greater than the predetermined value from the signals output from the light-intercepting means and for storing said detected light images as Purkinje image candidates; the Purkinje image candidate storage means for detecting the light images having luminance greater than the predetermined value from the signals output from the two-dimensional light-intercepting means and for storing said detected light images as Purkinje image candidates.

Thus, light images having luminance greater than the predetermined value are selected as the Purkinje image candidates and stored.

And, according to the present invention, the Purkinje image extraction means contains the Purkinje image selection means for detecting the rising and trailing slopes of respective signals stored as the Purkinje image candidates in the Purkinje image candidate storage means and for selecting the Purkinje image according to the result of said detection. Thus, the Purkinje image is selected from the Purkinje image candidates by measuring the gradients of the rising and trailing slopes of respective signals.

Also, according to the present invention, the Purkinje image extraction means contains the Purkinje image selection means for examining the positional relation between respective Purkinje image candidates stored in the Purkinje image candidate storage means and the pupil and for selecting the Purkinje image according to the result of said examination. Thus, the Purkinje image candidate pair nearest to (the center of) the pupil is selected as the Purkinje image.

Further, according to the present invention, the Purkinje image extraction means contains the Purkinje image selection means for detecting the number of pixels, which are aligned two-dimensionally, of respective signals of the Purkinje image candidates stored in the Purkinje image candidate storage means and for selecting the Purkinje image according to the result of said detection. Thus, the Purkinje image candidates consisting of more pixels than the predetermined number are excluded as ghost images generated in the glasses, or the like. And the Purkinje image is selected from the Purkinje image candidates consisting of as many pixels as or less pixels than the predetermined number.

In addition, according to the present invention, the Purkinje image extraction means contains the Purkinje image selection means for selecting the Purkinje image according to the distances, in the directions in which the elements of the light projector means are arranged, between the center of adjacent light images stored as the Purkinje image candidates in the Purkinje image candidate storage means. Thus, the Purkinje image is selected from the pairs of adjacent light images which are present substantially at the same position in said directions and the distance between which is smaller than the predetermined value.

Furthermore, according to the present invention, the Purkinje image extraction means contains the Purkinje image selection means for selecting the Purkinje image according to the number of the centers of the light images, in the directions in which the elements of the light projector means are arranged, which are stored as the Purkinje image candidates in the Purkinje image candidate storage means. Thus, the Purkinje image is selected from the groups of Purkinje image candidates having as many centers of light images which are present substantially at the same position in said directions as the elements of the light projector means.

Accordingly, the influence of highly luminous light images caused by, for example, outdoor daylight can be avoided and the Purkinje image can be exactly extracted.

What is claimed is:

1. A visual axis detection apparatus comprising:
    illumination means for illuminating an eyeball;
    light receiving means having a plurality of photoelectric transfer elements for intercepting reflected light from the eyeball;
    storage means for storing a plurality of Purkinje image candidates from among signals obtained by receiving the light with said light receiving means;
    selection means for selecting Purkinje image candidates satisfying predetermined conditions as the Purkinje image from the plurality of Purkinje image candidates; and
    detection means for detecting a state of the visual axis on the basis of the Purkinje image selected by said selection means.

2. A visual axis detection apparatus according to claim 1, wherein said storage means stores position information of the photoelectric transfer elements having charge signals greater than a predetermined value.

3. A visual axis detection apparatus according to claim 1, wherein said light receiving means includes an area sensor.

4. A visual axis detection apparatus according to claim 1, wherein said selection means measures size of the plurality of Purkinje image candidates and selects smaller Purkinje image candidates.

5. A visual axis detection apparatus according to claim 1, wherein said selection means selects two of the plurality of Purkinje image candidates.

6. A visual axis detection apparatus according to claim 1, wherein said detection means detects the state of the visual axis further on the basis of information about the pupil of the eye.

7. A visual axis detection apparatus comprising:
    illumination means for illuminating an eyeball;
    light receiving means, having a plurality of photoelectric charging elements, for receiving reflected light from the eyeball;
    storage means for storing plural items of positional information corresponding to photoelectric charging elements having charge signals greater than a predetermined value;
    selection means for selecting positional information satisfying predetermined conditions as the Purkinje image from among the plural items of positional information; and
    detection means for detecting a state of the visual axis on the basis of the selected positional information.

8. A visual axis detection apparatus according to claim 7, wherein said light receiving means includes an area sensor.

9. A visual axis detection apparatus according to claim 7, wherein said selection means selects two of the plurality of items of positional information.

10. A visual axis detection apparatus according to claim 7, wherein said detection means detects the state of the visual axis further on the basis of information about the pupil of the eye.

11. A visual axis detection apparatus according to claim 1, wherein said selection means selects Purkinje image candidates near the pupil's center as the Purkinje image.

12. A visual axis detection apparatus according to claim 7, wherein said selection means selects items of positional information near the pupil's center as the Purkinje image.

13. A visual axis detection apparatus comprising:
    illumination means for illuminating an eye;
    light receiving means, having a plurality of photoelectric charging elements, for receiving light reflected from the eye;
    storage means for storing a plurality of items of positional information corresponding to photoelectric charging elements that have charge signals which are greater than a first predetermined value and which are different from the charge signals of neighboring charging elements by at least a second predetermined value;
    selection means for selecting positional information satisfying predetermined conditions as the Purkinje image from among the plurality of items of positional information; and
    detection means for detecting a state of the visual axis on the basis of the selected positional information.

14. An apparatus according to claim 13, wherein said light receiving means includes an area sensor.

15. An apparatus according to claim 13, wherein said selection means selects two of the plural items of positional information.

* * * * *

UNITED STATES PATENT AND TRADEMARK OFFICE
CERTIFICATE OF CORRECTION

PATENT NO. : 5,570,157
DATED : October 29, 1996
INVENTOR(S) : KAZUKI KONISHI

It is certified that error appears in the above-indentified patent and that said Letters Patent is hereby corrected as shown below:

COLUMN 1

Line 51, "among" should read --from among--.

COLUMN 2

Line 50, "are" should read --is--.
Line 52, delete "as" (second occurrence).

Line 55, "focusing operation)," should read --focusing) operation,--.

COLUMN 3

Line 42, "having numbers" should read --having a number--.
Line 43, "numbers" should read --number--.
Line 44, "value" (first occurrence) should read --values--.
Line 48, "(1)d" should read --(1) d--.
Line 50, "(2)d" should read --(2) d--.
Line 58, "pixel" should read --pixels--.

COLUMN 4

Line 32, "Bnx1=1" should read --Bnx1=i--.
Line 45, "in" should read --in the--.
Line 58, "L2" should read --L2,--.

UNITED STATES PATENT AND TRADEMARK OFFICE
CERTIFICATE OF CORRECTION

PATENT NO. : 5,570,157

DATED : October 29, 1996

INVENTOR(S) : KAZUKI KONISHI

It is certified that error appears in the above-indentified patent and that said Letters Patent is hereby corrected as shown below:

COLUMN 5

Line 48, "two" should read --to the--.

COLUMN 6

Line 28, "are" should read --is--.
Line 31, "in" should read --in the--.
Line 32, "coordinate" should read --coordinates--.

COLUMN 7

Line 36, "edge. And" should read --edge, and--.
Line 38, "expression;" should read --expression:--.
Line 40, "d[j]<d[j-1 ]<d[j-1]<..." should read --d[j]<d[j-1]<d[j-2]<...--.
Line 44, "Secondary," should read --Second,--.
Line 64, "are" should read --is--.
Line 64, delete "10".

COLUMN 8

Line 7, "pupil" should read --pupil's--.
Line 8, delete "'s".
Line 24, "right pupil's" should read --pupil's right--.
Line 28, "a" should read --+a--.
Line 32, "STEP 603." should read --in step 603.--

UNITED STATES PATENT AND TRADEMARK OFFICE
CERTIFICATE OF CORRECTION

PATENT NO. : 5,570,157

DATED : October 29, 1996

INVENTOR(S) : KAZUKI KONISHI

It is certified that error appears in the above-indentified patent and that said Letters Patent is hereby corrected as shown below:

COLUMN 10

```
Line 22, delete "d[".
Line 25, "line" should read --lines--.
Line 67, "block." should read --blocks.--
```

COLUMN 11

```
Line 5, "block." should read --blocks.--.

Line 45, "product" should read --the product--.
Line 60, "to be" should read --is--.
Line 61, "points" should read --point--.
```

COLUMN 12

```
Line 3, "Bbx2-j" should read --Bbx2<j--.
Line 40, "SEx[B]:" should read --SIx[B]:--.
```

UNITED STATES PATENT AND TRADEMARK OFFICE
CERTIFICATE OF CORRECTION

PATENT NO. : 5,570,157

DATED : October 29, 1996

INVENTOR(S) : KAZUKI KONISHI

It is certified that error appears in the above-indentified patent and that said Letters Patent is hereby corrected as shown below:

COLUMN 13

Line 29, "examined. And" should read --examined, and--.
Line 48, "B3" should read --B3,--.
Line 56, "(B4y2-B4y2+1)" should read --(B4y2-B4y2+1)]--.

COLUMN 14

Line 29, "product" should read --the product--.

COLUMN 15

Line 46, "selecting Purkinje" should read --selecting from among the stored Purkinje--.
Line 47, delete "satisfying predetermined conditions".
Line 48, "image from the plurality" should read --image based on the size of each of the plurality--.

Signed and Sealed this

Twenty-seventh Day of May, 1997

Attest:

BRUCE LEHMAN

Attesting Officer    Commissioner of Patents and Trademarks